(12) United States Patent
Burns (10) Patent No.: US 7,553,537 B2
(45) Date of Patent: Jun. 30, 2009

(54) POSITION IDENTIFICATION PATTERN

(75) Inventor: Roland John Burns, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 569 days.

(21) Appl. No.: 11/081,058

(22) Filed: Mar. 16, 2005

(65) Prior Publication Data

US 2005/0212779 A1  Sep. 29, 2005

(30) Foreign Application Priority Data

Mar. 18, 2004  (GB) ................... 0406063.8

(51) Int. Cl.
  *B41M 5/00* (2006.01)
(52) U.S. Cl. .......... 428/195.1; 178/18.09; 345/166
(58) Field of Classification Search .......... 428/195, 428/195.1; 250/559.01–559.06, 559.29–559.38; 178/18.01–19.05; 382/190–205; 345/166
See application file for complete search history.

(56) References Cited

U.S. PATENT DOCUMENTS

| | | | | |
|---|---|---|---|---|
| 3,609,237 A | * | 9/1971 | Gerber | ............... 178/18.09 |
| 3,997,891 A | * | 12/1976 | Iwamura et al. | ............. 345/180 |
| 4,126,395 A | * | 11/1978 | Ross et al. | .................. 356/613 |
| 4,891,508 A | * | 1/1990 | Campbell | .................... 250/221 |
| 4,972,496 A | * | 11/1990 | Sklarew | ...................... 382/187 |
| 5,319,469 A | * | 6/1994 | Moolenaar | .................. 382/236 |
| 5,416,562 A | * | 5/1995 | Ota et al. | ...................... 355/53 |
| 5,442,147 A | * | 8/1995 | Burns et al. | ............. 178/18.09 |
| 6,432,518 B1 | * | 8/2002 | Torii et al. | ............... 428/195.1 |
| 2003/0104938 A1 | | 6/2003 | Torii et al. | |

FOREIGN PATENT DOCUMENTS

| | | |
|---|---|---|
| EP | 0 206 246 | 12/1986 |
| EP | 880267 A2 * | 11/1998 |
| JP | 56024933 A * | 3/1981 |
| WO | WO 02/082366 | 10/2002 |
| WO | WO 03/001442 | 1/2003 |

* cited by examiner

*Primary Examiner*—Kevin M. Bernatz
*Assistant Examiner*—Gerard T Higgins (57) ABSTRACT

A product 10 has a position identifying pattern 16 on it, the pattern comprising first and second positional components 24, 26 arranged to identify first and second positional coordinates x, y by means of their reflectivity at different respective wavelengths. Each component 24, 26 has a reflectivity at its respective wavelength that varies with position on the product 10 so that its reflectivity at a point is indicative of the position of that point, the pattern further comprising reference markings 34, 36 arranged to identify a fixed point in the scale of reflectivity of at least one of the positional components.

18 Claims, 6 Drawing Sheets

POSITION IDENTIFICATION PATTERN

FIELD OF THE INVENTION

The present invention relates to position identification pattern, and to products, such as documents, having the position identification pattern on them.

BACKGROUND OF THE INVENTION

It is known to use documents having such position identification markings in combination with a pen having an imaging system, such as an infra red camera, within it, which is arranged to image a small area of the page close to the pen nib. The pen includes a processor having image processing capabilities and a memory and is triggered by a force sensor in the nib to record images from the camera as the pen is moved across the document. From these images the pen can determine the position of any marks made on the document by the pen. The pen markings can be stored directly as graphic images, which can then be stored and displayed in combination with other markings on the document. In some applications the simple recognition that a mark has been made by the pen on a predefined area of the document can be recorded, and this information used in any suitable way. This allows, for example, forms with check boxes on to be provided and the marking of the check boxes with the pen detected. In further applications the pen markings are analysed using character recognition tools and stored digitally as text.

Examples of known patterns include lines at variable spacings, such as those disclosed in EP 0 206 246, and dot patterns in which the dot pattern varies in a systematic manner such as those disclosed in, for example, WO 02/082366. It will be appreciated that for these systems to work the imaging system in the pen needs to image an area of the product that is sufficiently large for the pattern it contains to be unique. Also the imaging capability of the pen needs to provide a sufficiently high resolution for the positions of the lines or dots to be identified.

Examples of known patterns involving varying reflectivity are disclosed for example in WO03/001442 or in US2003/104938. The variation on reflectivity is however dependent on environmental conditions such as lighting or on the way the system is used or even on the system itself, so that accurate absolute positioning may lack in precision.

SUMMARY OF THE INVENTION

The present invention therefore provides a product having a position identifying pattern on it, the pattern comprising first and second positional components arranged to identify first and second positional coordinates by means of their reflectivity at different respective wavelengths, wherein each component has a reflectivity at its respective wavelength that varies with position on the product so that its reflectivity at a point is indicative of the position of that point, the pattern further comprising reference markings arranged to identify a fixed point in the scale of density of at least one of the positional components. The reference markings may comprise upper and lower reference markings, arranged to identify two fixed points in said scale. The reference markings can help with calibration of measurements of the density of the of the pattern components.

The reflectivity of at least one of the components can be varied by varying the density of one or more marking materials of which it is made up. The positional components may therefore be formed from marking materials having different spectral properties, and at least one of the components may have a density that varies with position on the product so that its density at a point is indicative of the position of that point.

The density of the marking material can be varied in a number of ways. For example it can be varied by varying the thickness of a substantially continuous layer of the marking material. In some cases, for certain areas of the product, the marking material is applied to only a proportion of each area, for example as a series of discrete dots, with the remaining part of the area being left unmarked. In this case the density of the marking material can be varied by varying the proportion or fraction of each area that is marked, for example by varying the size and spacing of the dots. Alternatively the reflectivity of at least one of the components may be varied by varying the marking material of which it is made up.

The coordinates may be Cartesian coordinates, or they may be based on other coordinate systems, such as polar coordinates.

The upper and lower reference markings and the positional components may be arranged sequentially so that a reading device moving across them can determine, from the order in which it passes over them, which direction it is moving in.

The reference marks and the positional components may form bands across the product, and each positional marking band may be of a constant density along its length. Furthermore the bands of the two positional components may each be substantially continuous over at least a part of the product such that they overlap each other.

At least one of the positional components may comprise a high level subcomponent arranged to indicate a region of the product, and a low level subcomponent arranged to identify a position within the region. The two subcomponents may be positioned relative to each other and to the reference markings such that they can be distinguished from each other by their relative positions.

The present invention further provides a system for generating a position identifying pattern for application to a product, the system being arranged to generate first and second positional components arranged to identify, when applied to the product, first and second positional coordinates by means of their reflectivity at different respective wavelengths, wherein the two positional components are defined such that each component has a reflectivity at its respective wavelength that varies with position on the product so that its reflectivity at a point is indicative of the position of that point, the system being further arranged to generate reference markings, the reference markings being arranged to identify, when applied to the product, a fixed point in the scale of reflectivity of at least one of the positional components.

The present invention still further provides a system for determining a position on a product, the system comprising a sensing system arranged to receive light at first and second frequencies from the product, and a processor arranged to determine from the intensity of the light at the first frequency, at a position on the product, a first coordinate of an identified position on the product, and from the intensity of the light at the second frequency, at a position on the product, a second coordinate of the identified position, wherein the processor is arranged to identify different intensities of light received at one of said frequencies, and to identify one of said intensities as a reference intensity and another of said intensities as a position identifying intensity, wherein the processor is arranged to calibrate its reading of the position identifying intensity using the reference intensity, thereby to identify a coordinate of a position on the product from the position identifying intensity.

The sensing system may be arranged to receive light of the two frequencies simultaneously. Alternatively it can be arranged to receive or sample light at the two frequencies at different times, for example alternately. The sensing system may be arranged to receive light of the two frequencies from the same position on the product. However, it may be arranged to receive light of the two frequencies from different positions. Provided those positions are known, the two coordinates of the pen strokes can be determined.

Corresponding methods are also provided, as well as a data carrier carrying data arranged to cause a computer system to carry out the method of the invention or to operate as a system according to the invention. The data carrier can comprise a floppy disk, a CDROM, a DVD ROM/RAM (including +RW, -RW), a hard drive, a non-volatile memory, any form of magneto optical disk, a wire, a transmitted signal (which may comprise an internet download, an ftp transfer, or the like), or any other form of computer readable medium.

Preferred embodiments of the present invention will now be described by way of example only with reference to the accompanying drawings.

DESCRIPTION OF THE PREFERRED EMBODIMENTS

Figure 1:
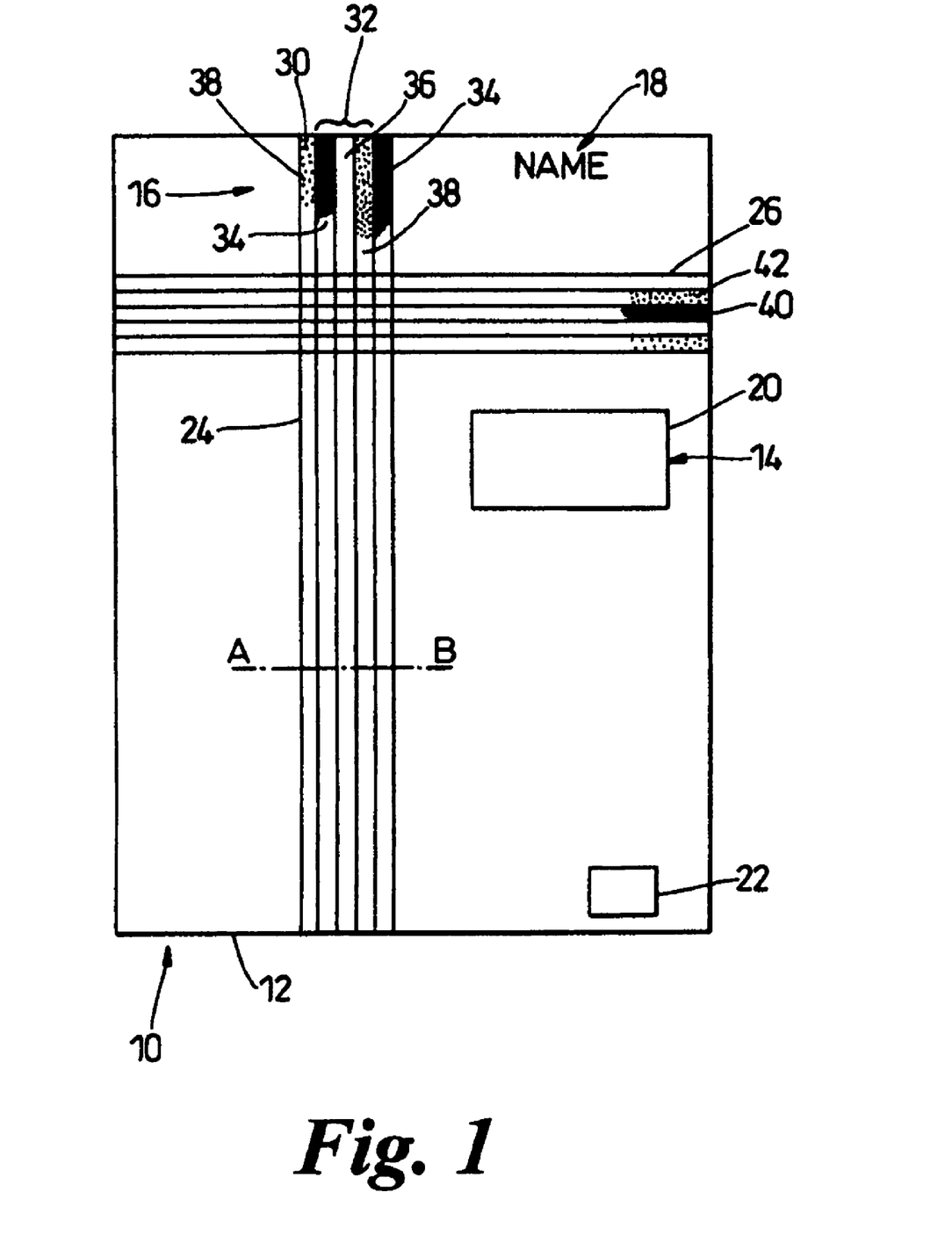
FIG. 1 is a schematic representation of a document according to a first embodiment of the invention.

Referring to FIG. 1 a document 10 comprises a paper substrate 12 with content markings 14 and position identifying pattern 16 on its surface. The content markings are clearly visible to the human eye, and in this case are made up of text 18, a box 20 in which a user is expected to write comments, and a check box 22. These content markings 14 are all made in black ink for ease of visibility. The position identifying pattern 16 is made up of a horizontal position component 24, which will be referred to as the x component, and a vertical position component 26, which will be referred to as the y component. Each of the x and y components 24, 26 are produced with a single colour of ink, the colours being different for the two components. Here the 'colour' refers to the wavelengths at which light is most predominantly reflected by the inks, which may be of visible wavelengths or may be of wavelengths not visible to the human eye, for example being infra-red (IR) or ultra-violet (UV). The x and y components 26, 24 are made up in the same way, and the x component 24 will now be described.

The x component 24 of the position identifying pattern 16 is made up of a series of vertical bands 30 extending down the page. These bands 30 are made up of groups 32 of three adjacent bands. In each group 32 there is an upper reference band 34, which is the most dense, having the most coverage of ink, a lower reference band 36, which is the least dense, having the least coverage of ink, and a position indicating band 38. The ink density in the position indicating band 38 depends on its position in the horizontal direction across the page. The position indicating band 38 at the left hand side of the document 10 is the least dense, in this case only slightly more dense than the lower reference band 36, and the position indicating band 38 on the right hand side of the document 10 is the most dense, being only slightly less dense than the upper reference band 34. Each of the bands 34, 36, 38 is, along its length and across its own area, of uniform density.

The y component 26 of the position identifying pattern 16 is made up of horizontal bands 40 in a corresponding manner, with the least dense position identifying bands 42 at the top of the document 10, and the most dense at the bottom. The width of each of the x and y component bands depends on the accuracy with which positions on the document 10 need to be measured, but in this case they are 0.01 inches across. This gives sufficient accuracy for normal handwriting to be recorded and analysed. It also means that, for a 10 inch document there will be about 333 groups of bands, and therefore there will need to be 333 densities of ink that can be distinguished from each other.

Figure 2:
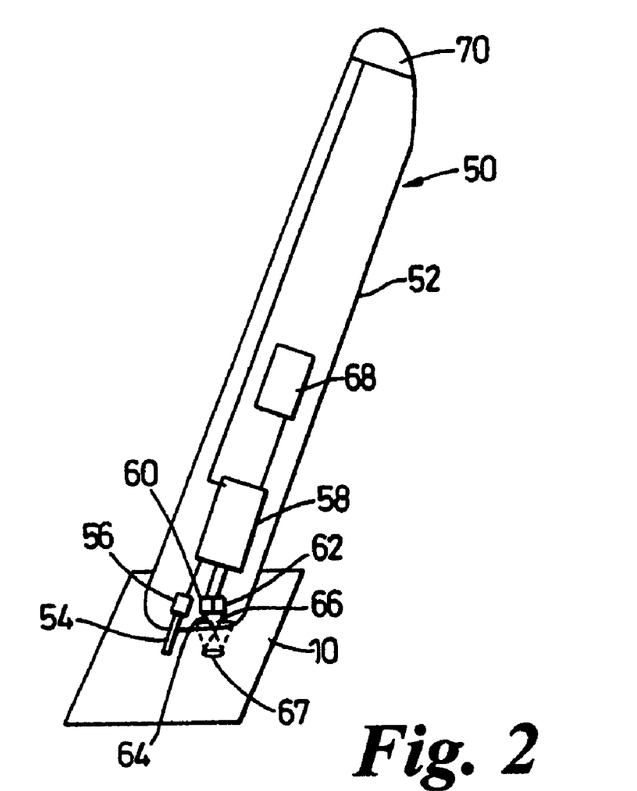
FIG. 2 is a schematic representation of a pen arranged for use with the document of FIG. 1.

Referring to FIG. 2, a pen 50 for use with the document 10 comprises a body 52 supporting a writing nib 54. A pressure sensor 56 is located behind the nib 54 and connected to a processor 58 which can determine, from signals from the sensor 56, when the nib 54 is in contact with the document 10. A pair of photovoltaic sensors 60, 62 are also located in the pen 50, each having a band pass filter 64, 66 in front of it. One of these filters 64 is arranged to pass light at the frequency of the x component ink, and the other is arranged to pass light at the frequency of the y component ink. The two sensors 60, 62 are arranged such that they both measure the light reflected from the same area 67, which is a small area, about 0.004 inches in diameter, i.e. 40% of the width of each band. The pen 50 may further comprise a light source to ensure sufficient illumination of the pattern 16. The size of the sensed area relative to the width of the bands 30 needs to be selected to ensure that it is large enough to provide an accurate measurement of the density of the marking material, but small enough to ensure that a sufficiently high probability that the sensed area will be totally within a single one of the bands 30. This area 67 is in a fixed and known position relative to the point of the pen nib 54 and therefore relative to the point of contact between the pen 50 and the document 10. Each of the sensors 60, 62 has its output connected to the processor. A memory 68 is connected to the processor 58 so that it can store details of pen strokes detected by the processor 58 as will be described below, and a communication device, which in this case is a radio transmitter 70 is also connected to the processor 58 so that it can transmit the pen stroke data to a computer system for analysis.

As the pen is used to make marks on the document 10, the signals from the sensors 60, 62 are analysed by the processor 58 which determines from them the position and shape of the pen strokes. In order to do this, the processor 58 samples the signals from the two sensors at regular intervals. This needs to be at a high enough frequency to ensure that details of the pen strokes can be captured. Assuming a maximum speed of around 10 inches per second for handwriting, a sample rate of 1000 Hz will provide a sample for every 0.01 inches of movement.

Figure 3:
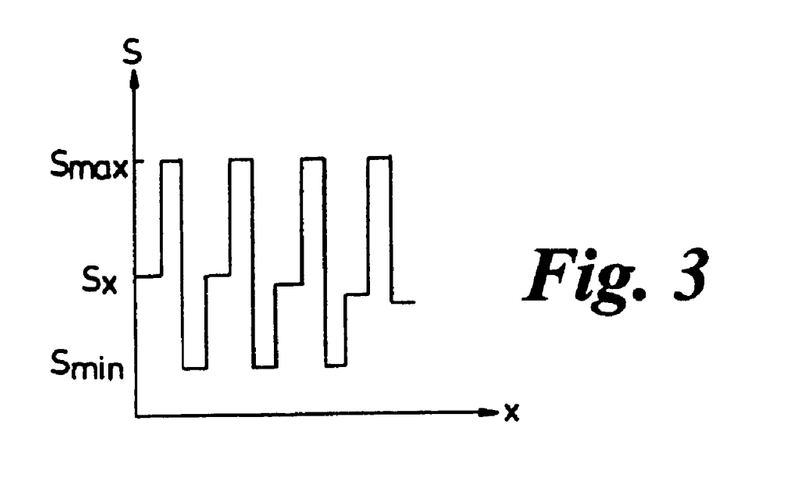
FIG. 3 is a graph showing signals within the pen of FIG. 2 as it moves over the document of FIG. 1.

If the pen is moved over the document 10 from point A to point B shown in FIG. 1, then the output signal S from x coordinate sensor 60 will change with position x as shown in FIG. 3. As the sensed area becomes the upper reference band 34, the amount of light of the wavelength of the filter 64 is as high as it will get, and the signal from the sensor 60 reaches a maximum value $S_{max}$. Then as the sensed area becomes the lower reference band 36, the amount of light of the wavelength of the filter 64 reduces to a minimum, and the signal from the sensor 60 reaches a minimum value $S_{min}$. Then as the sensed area becomes the position identifying band 38, the signal changes to an intermediate value $S_x$ which will depend on the density of the ink in the position identifying band 38 and therefore be indicative of the position of the pen in the x direction. This pattern is then repeated as the pen moves across adjacent groups 32 of x coordinate bands, and in each case the signal when the sensed area is the position identifying area will vary slightly, depending on the pen's position. From each group of three signal levels, the processor 58 can determine the relative density of the position identifying band 38, and therefore the x coordinate position of that band 38 on the document 10.

The processor 58 can also determine the direction in which the pen nib 54 is travelling, by determining the order in which the upper and lower reference bands 34, 36 are crossed. In this case if it crosses an upper reference band 34 then a lower reference band 36, then a position identifying band 38, it can determine that it is moving from left to right as seen in FIG. 1. If it detected a lower reference band 36, then an upper reference band 34, then a position identifying band 38, it could determine that it was moving from right to left. Once the pen has passed over one group of three bands 30, it can determine from each subsequent band that it has moved by the distance of the width of the bands. It can also detect from the type of each new band it moves over whether it is continuing in the same direction, or whether it has changed direction. If the three band types occur in the same order, then the direction is the same, but if the order changes, then the direction of travel must also have changed.

Simultaneously with the variations in the signal from the x coordinate sensor 60 just described, similar variations in the signal from the y coordinate sensor will also be detected, enabling the processor to determine the position of the pen nib 54 in the vertical direction on the document 10. Since each sample from each sensor is time stamped, the two sets of coordinates can be combined to determine the absolute position of the pen nib 54 as it moves across the document 10, and hence the position and shape of the pen strokes made on the document 10 by the pen 50. For any one continuous pen stroke, it is only necessary for the sensors 60, 62 to pass over one group of three bands 30 from the x coordinate component and one group of three bands from the y coordinate component for the absolute position of the pen stroke to be determined.

Figure 4:
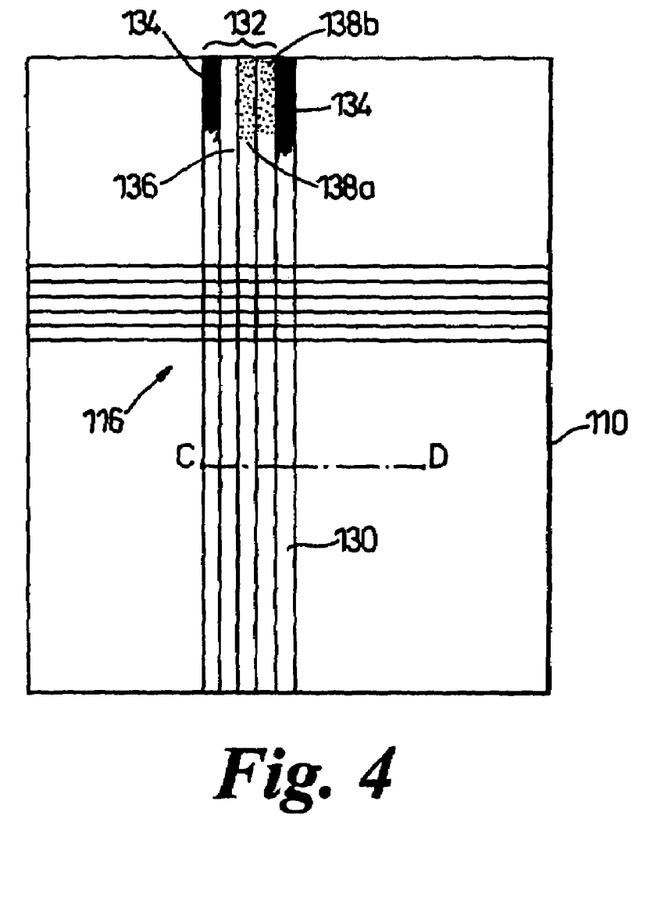
FIG. 4 is a schematic representation of a document according to a further embodiment of the invention.

Referring to FIG. 4, in a document 110 according to a second embodiment of the invention, the x and y components of the position identifying pattern 116 are again made up of perpendicular bands 130 of different coloured inks as in the embodiment of FIG. 1. However in this second embodiment the bands are divided into groups 132 of four bands. In each group, there is an upper reference band 134 and a lower reference band 136. There is also a high level position identifying band 138a and a low level position identifying band 138b. The low level position identifying band can have any of a range of densities in the same way as the position identifying band 38 of FIG. 1. The high level position identifying band 138a can have one of a smaller number of densities, in this case ten. These possible densities are spread evenly over the range between the maximum and minimum densities of the reference bands 134, 136, and therefore the difference between any two of the high level bands 138a will always be at least one tenth of the difference in density between the two reference bands 134, 136. This ensures that each high level band 138a can be easily distinguished. The addition of the high level bands 138a allows the whole range of low level band 138b densities to be repeated, each time with a different high level band 138a density. The y coordinate bands are produced using the same structure as the x coordinate bands. Compared to the embodiment of FIG. 1, this can be used to increase the width and length of the pattern that can be uniquely identified by a factor of 10, and therefore the total area by a factor of 100. Alternatively it can be used to increase the change in density between neighbouring position identifying bands, while keeping the total pattern area the same. This can improve the accuracy with which the pattern can be read, or make it possible to produce a satisfactory pattern using cheaper printing methods.

Figure 5:
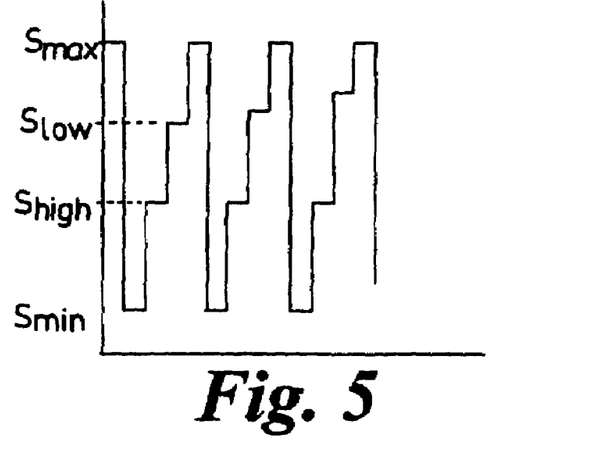
FIG. 5 is a graph showing signals within the pen of FIG. 2 as it moves over the document of FIG. 4.

In order for the pen 50 of FIG. 2 to be able to read this pattern, minor modifications need to be made to the processor. As the nib 54 is passed over the document 110, from point C to point D on FIG. 4, the signal from the x coordinate sensor 60 will vary as shown in FIG. 5. Firstly it will reach a maximum level $S_{max}$ as the sensor moves over the upper reference band 134, then it will reach a minimum level $S_{min}$ as the sensor 60 moves over the lower reference band 136, then it will change to a first intermediate level $S_{higher}$ as the sensor moves over the higher level band 138a, and then to a second intermediate level $S_{lower}$ as the sensor moves over the lower level band 138b. Once the sensor 60 has moved across any four adjacent bands 130, the processor 58 can determine from the relative levels of the four signals which are the upper and lower reference signals. From the order in which the upper and lower reference bands 134, 136 occurred it can determine the direction of travel of the pen nib 54, and therefore which of the other two bands is the upper 138a and which the lower level position identifying band 138b. As shown in FIG. 5, since the high level band density only changes once for each cycle of low level band density changes, the high level band density will often remain constant over the positions covered by a single pen stroke, while the density of the low level bands 138b changes.

It will be appreciated that the approach of having high and low level position indicating bands can be built upon. For example more than two levels of position indication can be used. This will increase the number of adjacent bands that need to be sensed for the position to be determined, but will also rapidly increase the total available area of pattern space, or increase the change in density that can be provided between adjacent position identifying bands, therefore increasing the robustness of the system.

Figure 6:
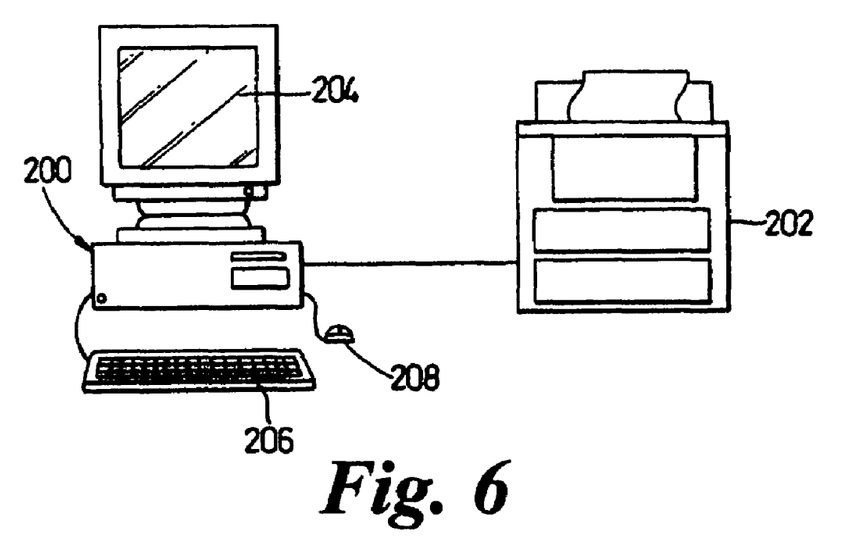
FIG. 6 is a schematic view of a computer system for producing and processing the documents of FIGS. 1 and 4.
Figure 7:
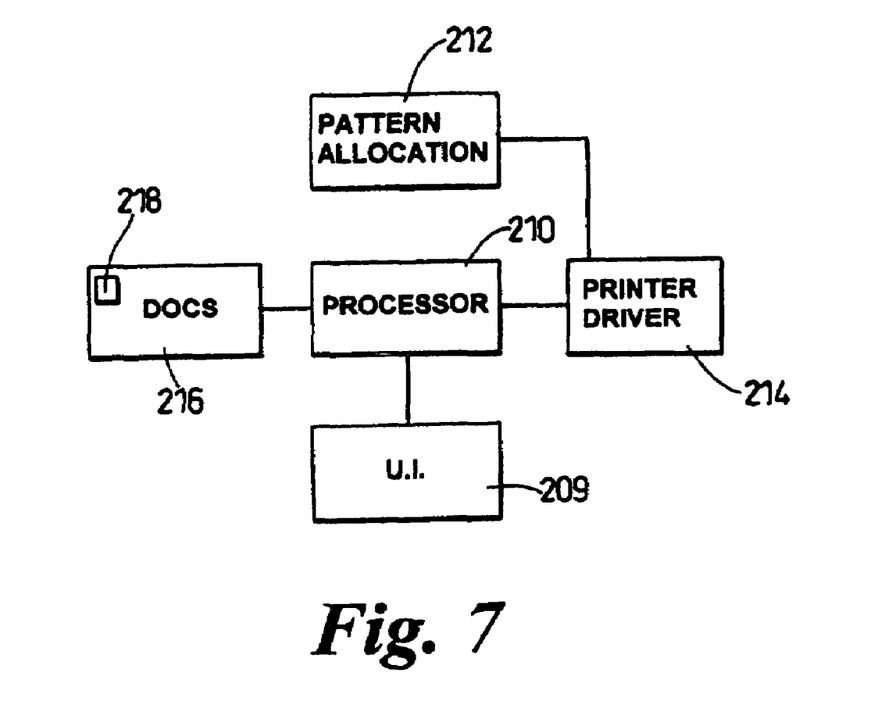
FIG. 7 is a diagram showing functional components of the system of FIG. 6.

Referring to FIG. 6, a very simple system for producing printed documents having the position identifying pattern on them comprises a personal computer(PC) 200 and a printer 202. The PC 200 has a screen 204, a keyboard 206 and a mouse 208 connected to it to provide a user interface 209 as shown generally in FIG. 7. As also shown in FIG. 7, the PC 200 comprises a processor 210 and a pattern allocation module 212 which is a software module stored in memory. The pattern allocation module 212 includes a definition of a total area of pattern space and a record of which parts of that total area have been allocated to specific documents, for example by means of coordinate references. The PC 200 further comprises a printer driver 214, which is a further software module, and a memory 216 having electronic documents 218 stored in it. The user interface 209 allows a user to interact with the PC 200.

In order to produce the printed document 10 the processor 210 retrieves an electronic document 218 from the memory 216 and sends it to the printer driver. The electronic document 218 contains a definition of the content 14 and the areas of the document 10 which are to have the pattern 16 printed on them. The printer driver 214 requests the required amount of pattern from the pattern allocation module 212 which allocates by means of coordinate references an area of the pattern space to the document, generates the pattern 16 for that area using a pattern generation algorithm, and communicates the details of the pattern including the positions, colours and densities of all the required bands 30, back to the printer driver 214. The printer driver 214 then combines the content 14 and the pattern 16 into a single file which contains an image including the pattern and the content, converts the content 14 and the pattern 16 to a format suitable for the printer 202, and sends it to the printer which prints the content 14 and the pattern 16 simultaneously as a single image.

In practice the various components of the system can be spread out over a local network or the internet. For example the pattern allocation module 212 can be provided on a separate internet connected server so that it can be accessed by a number of users.

Figure 8:
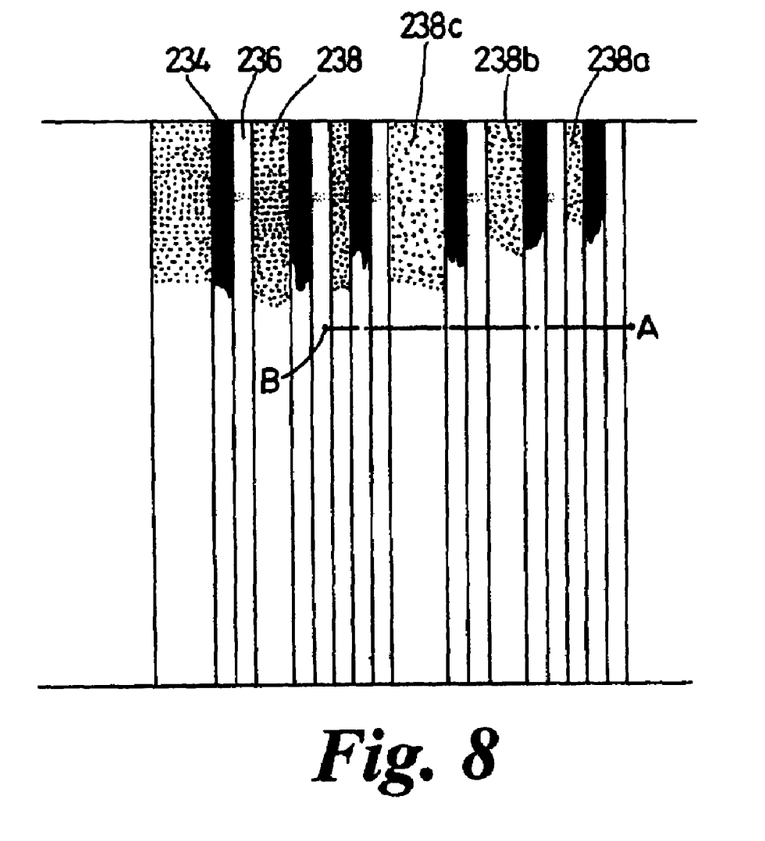
FIG. 8 is a schematic view of a document according to a further embodiment of the invention.

Referring to FIG. 8, in a further embodiment, the x and y components of the-position identifying pattern are made up of bands in a similar manner to those of FIG. 1. Only the x component bands 230 are shown in FIG. 8, and these are made up of upper and lower reference bands 234, 236 and position indicating bands 238 in the same way as the embodiment of FIG. 1. However, in this embodiment the width of the position indicating bands 238 is arranged to vary in a predetermined manner, so that the width of those bands can be used as a further indicator of position. Specifically, the position indicating bands are arranged in groups of three, each group comprising a first band 238a that is the same width as the reference bands 234, 236, a second band 238b that is twice as wide as the reference bands 234, 236, and a third band 238c that is three times as wide as the reference bands 234, 236. The width of the position identifying bands 238 therefore provides a further indication of the position in the x direction. This is in addition to the density of the position identifying bands 238 that changes in steps between each band 238a, 238b, 238c and the next in the same way as the embodiment of FIG. 1.

Figure 9:
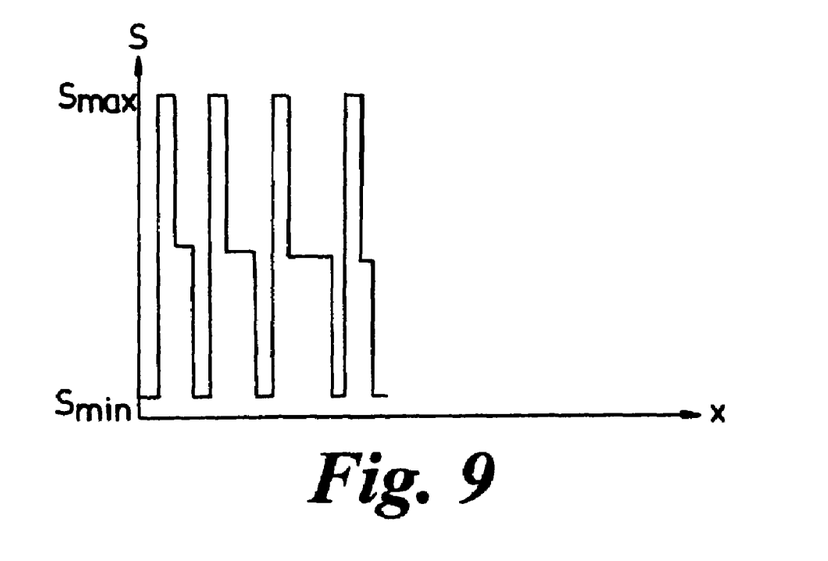
FIG. 9 is a graph showing signals within the pen of FIG. 2 as it moves over the document of FIG. 8.

As the pen 2 is moved over the pattern of FIG. 8, from position A to position B, the signal from the x coordinate sensor 60 produces a signal as shown in FIG. 9. This varies between an upper reference value $S_{max}$, a lower reference value $S_{min}$, and an intermediate level $S_x$ in a similar manner to that shown in FIG. 3. However, assuming that the pen 2 is moving at a constant speed, the periods when the signal is at the intermediate level will vary in length as well as in signal magnitude. Specifically, as the pen is passing over the narrowest position indicating bands 238, the time for which the signal $S_x$ is at the intermediate level will be the same as the time for which it was at the maximum and minimum levels $S_{max}$, $S_{min}$. As the pen passes over the medium width bands 238b, the time for which the signal is at the intermediate level $S_x$ will be twice that for which it is at the maximum and minimum levels. As it passes over the widest position indicating bands 238c, the time at which it is at the intermediate level $S_x$ will be three times that for which it is at the maximum and minimum levels. This means that, when the sensor signals are processed the processor 58 in the pen 2 can use a look-up table or other suitable reference mechanism that associates each level of the signal $S_x$ with one of the three band widths. Therefore, provided the density of the marking material can be determined to within one of three adjacent levels, the specific position identifying band 238 can be identified on the basis of its width, which can be measured relative to the width of the reference bands 234, 236 by virtue of the length of time at which the sensor signal $S_x$ remains at the relevant level.

In a modification to the embodiment of FIG. 8, the densities of the three position identifying bands 238a, 238b, 238c in each group are the same, with each group of three bands 238a, 238b, 238c having a different intensity to the next group. Assuming that there is a minimum difference in density that can be detected by the pen 2, then this difference only needs to occur between adjacent groups of three position identifying bands. The bands in a group are therefore distinguished from each other only on the basis of their width. This potentially increases the number of bands that can be provided, and therefore can increase either the area of pattern that can be generated, or the accuracy with which the pattern can identify position.

Figure 10:
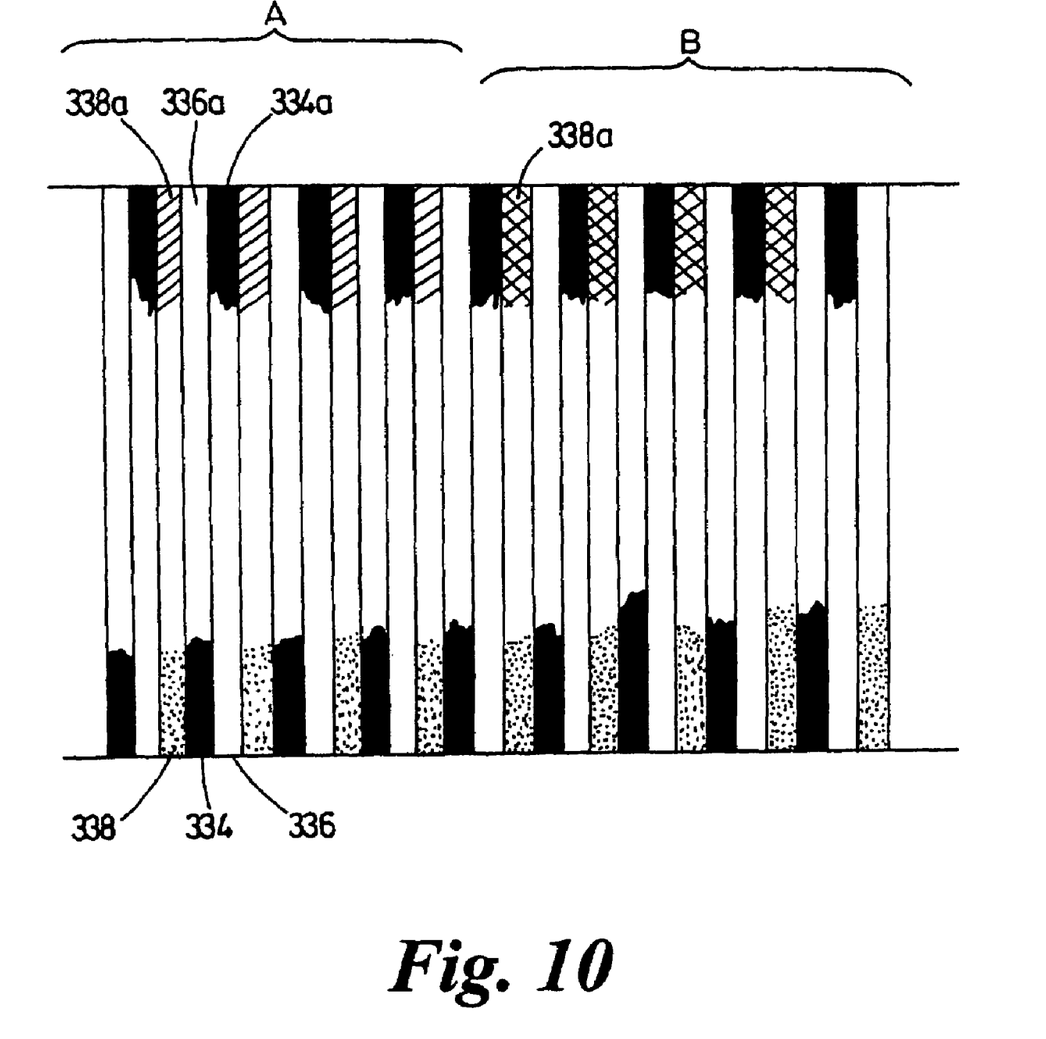
FIG. 10 is a schematic view of a document according to a further embodiment of the invention.

Referring to FIG. 10, in a still further embodiment of the invention, the component of the pattern making up each of the two components is made up of two subcomponents produced from different types of ink, each with different spectral properties. The x component is shown in FIG. 10, with the y component being superimposed on it. The first subcomponent of the x component pattern is the same as the pattern of FIG. 1, comprising upper and lower reference bands 334, 336 and a position identifying band 338. These bands are all the same width and the density of the position identifying bands varies gradually across the document. The second subcomponent of the x component is produced using a different ink from the first subcomponent, but it is also made up of upper and lower reference bands 334a, 336a and position indicating bands 338a. The relative positions of the two sets of bands can be arranged in a number different ways, but in this case the upper and lower reference bands 334a, 336a of the second subcomponent are superimposed on the lower and upper reference bands 336, 334 of the first subcomponent respectively, and the two sets of position identifying bands 338, 338a are superimposed on each other.

The density of the position identifying bands 338 of the first subcomponent of the x component pattern varies from each band 338 to the next between a number of different densities, in this case 100. For each set A, B of 100 of these bands 338, the density of the superimposed second position identifying bands 338a is the same. Then the whole set of densities of the first subcomponent bands 338 is repeated, but with a different density of the second subcomponent band 338a. The second subcomponent of the x component, which has the lower spatial frequency, can therefore be considered as dividing the total pattern area into regions, and the first subcomponent, which has a higher spatial frequency, can be considered as identifying a position within one of the regions.

Since there are two different colours of ink for each of the x and y components in this embodiment, the pen 2 needs to be modified so as to be able to sense four different wavelengths of light. It then uses the signal from one wavelength to read the second subcomponent of the pattern, thereby identifying which zone or region of the pattern or document it is moving over, and the signal from another wavelength to read the first subcomponent of the pattern, thereby to identify the position within that zone. It will be appreciated that this is simplest if the ink for one of the subcomponents is transparent at the wavelength of the other subcomponent, and is applied to the product after that other subcomponent. However, it is possible to use inks where this is not the case. For example in the arrangement of FIG. 10 since the lower reference bands for each subcomponent have no ink from that component, the reference bands do not require one of the inks to be superimposed on the other. In the position identifying bands 338, 338*a*, if each ink is only applied in relatively low densities, up to 50% coverage of the area of those bands, the inks for the two subcomponents can be applied as dots interspersed between each other without the dots actually being applied one on top of the other.

It will be appreciated that, provided one of the inks of the two subcomponents is transparent at the wavelength of the other subcomponent, the transparent ink can be applied on top of the other ink without interfering with detection of light reflected from that other ink. The bands of the first high frequency subcomponent and second low frequency subcomponent of the pattern then do not need to based on the same band width, or have the same structure. For example the first subcomponent of the x coordinate pattern of FIG. 10 could be replaced by the pattern of FIG. 8. Alternatively the bands of the low frequency subcomponent of the pattern could be wider than those of the high frequency subcomponent, since the low frequency subcomponent only needs to be 'read' once for each pen stroke to identify the part of the document that the pen stroke is being made in. Also if either the first subcomponent or the second subcomponent has a smaller number of position identifying densities such that the difference between adjacent intensities is greater, the need for reference bands may be reduced or even eliminated altogether for that subcomponent.

In a still further modification, the high frequency subcomponent of the pattern can be made to vary at a spatial frequency that is not an exact multiple of the frequency of the low frequency subcomponent. This will produce a beat frequency between the two subcomponents that is at a lower spatial frequency than the low frequency component. This beat frequency variation in the combined high and low frequency patterns will therefore produce an x-coordinate reference that is unique over the spatial wavelength of the beat frequency pattern. This will be several times the spatial wavelength of the high level subcomponent. For example, each maximum density of the position identifying bands of the low frequency subcomponent will occur at a different point in the cycle of the high frequency subcomponent. This can be used as a further check on position, or to increase the defined area of pattern space. The pen is arranged to determine the intensity of light at the wavelengths of the high and low level subcomponents, determine for each of the high and low level subcomponents the phase in the spatial cyclical variation in intensity, and determine from these phases the x coordinate. The x coordinate can be determined uniquely over a wavelength of the beat frequency pattern.

What is claimed is:

1. A product having a position identifying pattern on it, the pattern comprising first and second positional components arranged to identify first and second positional coordinates by means of their reflectivity at different respective wavelengths, wherein each component has a reflectivity at its respective wavelength that varies with position on the product so that its reflectivity at a point is indicative of the position of that point, and wherein the pattern farther comprises reference markings comprising upper and lower reference markings corresponding to a maximum and a minimum reflectivity, of said first and second positional components and wherein the upper and lower reference markings and the positional components are arranged sequentially so that a reading device moving across them can determine, from the order in which they occur, which direction said reading device is moving.

2. A product according to claim 1 wherein the two positional components are formed from marking materials having different spectral properties, and at least one of the components has a density that varies with position on the product so that its density at a point is indicative of the position of that point.

3. A product according to claim 1 wherein the reference marks and the positional components form bands across the product.

4. A product according to claim 3 wherein each positional component is of a constant reflectivity along its length.

5. A product according to claim 3 wherein the bands of the two positional components overlap each other.

6. A product according to claim 1 wherein at least one of the positional components comprises a high level subcomponent arranged to indicate a region of the product, and a low level subcomponent arranged to identify a position within the region.

7. A product according to claim 6 wherein the two subcomponents are positioned relative to each other and to the reference markings such that they can be distinguished from each other by their relative positions.

8. A product according to claim 6 wherein the two subcomponents are produced using the same marking material.

9. A product according to claim 6 wherein the two subcomponents are produced using different marking materials having different spectral properties.

10. A product according to claim 9 wherein the low level subcomponent is arranged to vary with a spatial frequency that is not an exact multiple of the spatial frequency of the high level subcomponent thereby producing a beat frequency that varies according to position on said product.

11. A product according to claim 1, wherein said first and second positional components each comprise two subcomponents, each subcomponent being printed with ink having different spectral properties.

12. A product having a position identifying pattern on it, the pattern comprising:
   first and second positional components arranged to identify first and second positional coordinates,
   said first positional component printed with a first color that varies in density at different positions over said product in a first dimension and said second positional component printed with a second, different color that varies in density at different positions over said product in a second dimension, such that a measured density of said first and second colors is indicative of a particular position on said product; and
   upper and lower reference markings corresponding to a maximum and a minimum density of said first and second colors wherein the upper and lower reference markings and the positional components are arranged sequentially so that a reading device moving across them can determine, from the order in which they occur, which direction said reading device is moving.

13. The product of claim 12, wherein each positional component is disposed between an upper and lower reference markings of a same color as that positional component.

14. The product of claim 12, wherein said first and second dimensions are orthogonal.

15. The product of claim 12, wherein each of said first and second positional components comprise a number of bands on said product all of equal width.

16. The product of claim 12, wherein each of said first and second positional components comprise a number of bands on said product, and wherein a width of said bands varies in accordance with position on said product.

17. The product of claim 12, wherein said first positional component comprises bands of said first color and a third, different color, and said second positional component comprises bands of said second color and a fourth, different color.

18. The product of claim 12, wherein:

at least said first positional component comprises first and second subcomponents;

an ink used to print one of the subcomponents is transparent at a wavelength for sensing an ink used to print the other of the subcomponents; and said first and second subcomponents are printed overlapping on said product.

* * * * *